Nov. 27, 1928.

P. F. PHELP

FRUIT TREE PROP

Filed Dec. 4, 1926

1,693,180

INVENTOR.
Phil Francis Phelp.

BY Alan Franklin
ATTORNEY.

Patented Nov. 27, 1928.

1,693,180

UNITED STATES PATENT OFFICE.

PHIL FRANCIS PHELP, OF LOS ANGELES, CALIFORNIA, ASSIGNOR OF ONE-HALF TO HARRY L. BONNELL, OF LOS ANGELES, CALIFORNIA.

FRUIT-TREE PROP.

Application filed December 4, 1926. Serial No. 152,614.

This invention relates to props, such as props for trees, and particularly fruit trees.

One of the objects of this invention is to provide a prop for supporting the limbs of a fruit tree which are overloaded with fruit.

Another object is to provide a prop for straightening the limbs of a tree that are bent out of shape or drooping.

Other objects and advantages will appear hereinafter as the specification progresses.

The invention is illustrated in the annexed drawing which forms a part of this specification and in which—

Corresponding parts are designated by the same reference characters in all the figures.

The invention includes generally a pole 1, a plurality of ropes 2 suspended from the upper end of said pole, hooks 3 and 4 connected to the lower ends respectively of said ropes and adjusting and securing means 5 for said hooks.

Figure 1:
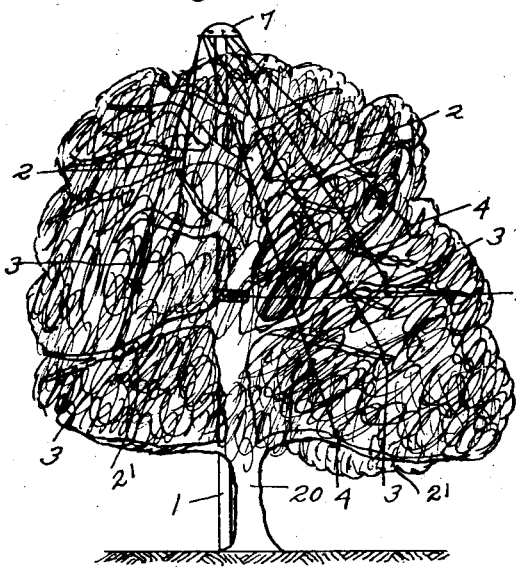
Fig. 1 is an elevation of my invention shown supporting the limbs of a tree.
Figure 2:
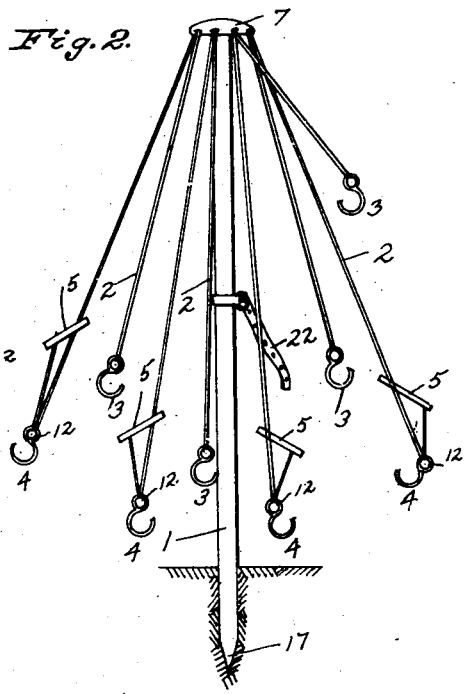
Fig. 2 is an elevation of one form of my prop.
Figure 4:
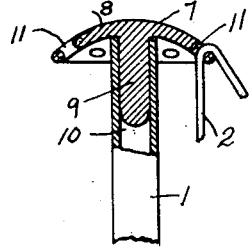
Fig. 4 is a fragmentary vertical section, on an enlarged scale, of the upper end of the prop shown in Figs. 1 and 2.

On the upper end of the pole shown in Figs. 1, 2 and 4 a rope head 7 is mounted, which includes a convexo concave head member 8 with a depending stem 9 which fits into a socket 10 in the upper end of the pole, the member 8 being provided with a plurality of holes 11 through which extend the ropes 2 respectively. A hook 3 is permanently connected to one end of each rope 2, while the other end of the rope is extended through an eye 12, at the upper end of a hook 4, and through an aperture 13 in one end of a bar 14 of one of the hook adjusting and securing elements 5, and said other end of the rope is tied in a knot 15 above the bar 14 to prevent the rope pulling through the aperture 13.

The other end of the bar 14 is provided with an aperture 16 through which extends the rope 2. The lower end of the pole shown in Figs. 1, 2 and 4 is pointed as at 17 so that the pole may be readily driven into the ground.

Said pole is driven into the ground at the trunk of the tree 20, and the hooks 3 and 4 are engaged with the fruit-overloaded or bent or drooping limbs 21 of the tree. The limbs are lifted by the ropes 2 and adjusted to the proper height and secured thereat by the elements 5, each limb supported by a hook 3 being balanced and supported by a limb supported by a hook 4 and vice versa. A belt 22 is secured to the pole 1 for securing the pole to the trunk of the tree.

Figure 5:
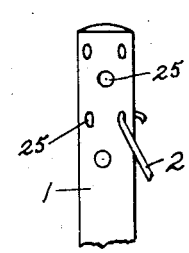
Fig. 5 is a fragmentary elevation of the upper end of the prop shown in Fig. 3.
Figure 6:
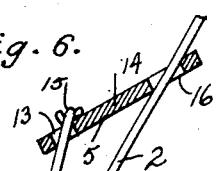
Fig. 6 is a side view, on an enlarged scale, of one of the prop supporting hooks and its adjusting and securing means.
Figure 3:
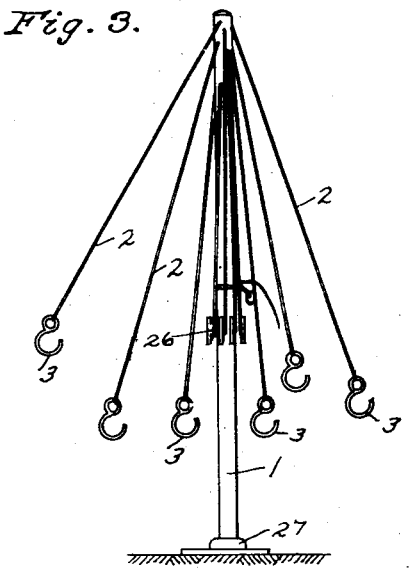
Fig. 3 is an elevation of another form of my prop.

In the form of the invention shown in Figs. 3 and 5, the head 7 and the hooks 4 are eliminated, while apertures 25 are extended through the sides of the upper end of the pole 1 and the ropes 2 extended through said apertures respectively, hooks 3 being secured to one end of the ropes and the other end of the ropes being fastened to the cleats 26 on the pole 1. The lower end of the pole may be mounted on a base 27 if desirable.

In this form of the invention each rope 2, by means of the hook 3 connected thereto, supports only one limb of the tree, the ropes being adjustable through the apertures 25 to lift the limbs to the proper height, and when so adjusted the ropes may be secured by their engagement with the cleats 26.

Figure 7:
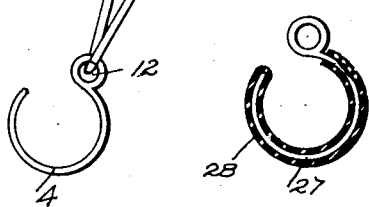
Fig. 7 is a view partly in elevation and partly in section of a special form of supporting hook.

The hook 27 shown in Fig. 7 is covered with a covering 28 of soft material so that the hook may hold up tender limbs without bruising or mutilating the same.

If desirable the cleats 26 may be eliminated and hooks 3 and 4 placed on the ends respectively of each rope as in the form of my invention shown in Figs. 1, 2, 4 and 6.

Having described my invention, what I claim as new and desire to secure by Letters Patent is:

1. A tree prop including a pole, ropes strung loosely from the upper end of said pole to be drawn in one direction or the other, a hook fixed to one end of each rope for engaging a limb of the tree, and a hook adjustably connected to the other end of each rope for engaging another limb of the tree.

2. A tree prop including a pole, a rope strung loosely from said pole to be drawn in one direction or the other, a hook fixed to one end of said rope, a hook formed with an eye through which the other end of said rope extends, and means for adjustably connecting said other end of the rope to the rope proper for adjusting the length of the rope.

3. In a tree prop, a pole, a rope strung loosely from the pole to be drawn in one direction or the other, means on the ends of the rope for engaging limbs of the tree respectively, and means for varying the length of the rope.

PHIL FRANCIS PHELP.